United States Patent
Arajs et al.

(10) Patent No.: US 6,993,634 B2
(45) Date of Patent: Jan. 31, 2006

(54) ACTIVE TRACKING AND RETRIEVAL OF SHARED MEMORY RESOURCE INFORMATION

(75) Inventors: Roland Arajs, San Jose, CA (US); Greg Limes, Tallahassee, FL (US); Rob Petri, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 10/133,800

(22) Filed: Apr. 29, 2002

(65) Prior Publication Data

US 2003/0204681 A1 Oct. 30, 2003

(51) Int. Cl.
*G06F 12/00* (2006.01)
(52) U.S. Cl. .................. 711/147; 711/154; 709/213; 707/3
(58) Field of Classification Search ............ 711/147, 711/152, 154, 149, 151; 709/213, 214, 215, 709/216, 217; 719/312, 318, 313, 315, 314, 719/316; 707/3, 7, 8, 100, 102, 103 R, 103 X, 707/103 Y, 103 Z
See application file for complete search history.

(56) References Cited

U.S. PATENT DOCUMENTS

| | | | |
|---|---|---|---|
| 6,606,666 B1 * | 8/2003 | Bell et al. ................... | 709/232 |
| 6,732,124 B1 * | 5/2004 | Koseki et al. .............. | 707/202 |
| 2002/0174258 A1 * | 11/2002 | Dale et al. .................. | 709/312 |
| 2002/0184441 A1 * | 12/2002 | Wong et al. ................ | 711/113 |
| 2003/0050974 A1 * | 3/2003 | Mani-Meitav et al. ...... | 709/203 |

OTHER PUBLICATIONS

Tanenbaum, "Structured Computer Organization", © 1984 Prentice-Hall, Inc., p. 10-12.*

* cited by examiner

*Primary Examiner*—Brian R. Peugh
(74) *Attorney, Agent, or Firm*—Pillsbury Winthrop Shaw Pittman LLP

(57) ABSTRACT

An arrangement is provided for actively tracking and retrieve shared memory resource information. Share memory object information is recorded. Upon a request from a user, recorded shared memory object information is scanned according to the request and reported to the user.

20 Claims, 8 Drawing Sheets

ACTIVE TRACKING AND RETRIEVAL OF SHARED MEMORY RESOURCE INFORMATION

RESERVATION OF COPYRIGHT

This patent document contains information subject to copyright protection. The copyright owner has no objection to the facsimilie reproduction by anyone of the patent document or the patent, as it appears in the U.S. Patent and Trademark Office files or records but otherwise reserves all copyright rights whatsoever.

BACKGROUND

Aspects of the present invention relate to shared memory. Other aspects of the present invention relate to share memory information management.

In a computing environment, a memory is used to store data. Such stored data may be accessed. Through data access, different processes can share information. For example, a process may store a piece of information at a particular memory location. When another process accesses the information from the memory location, the two processes effectively share the same piece of information. Information sharing through shared memory may occur at different levels of applications. For instance, different processes in an application may exchange information through shared memory. Threads within a process may also share information through memory.

Information sharing through shared memory may also manifest in different forms. More sophisticated memory sharing schemes have been developed. For example, memory may be shared in the form of an object whose implementation (e.g., the memory location it resides) may be hidden from its users. In this way, processes that share memory objects can handle objects at a more conceptual or transparent level. To facilitate that, some of the burden has been shifted to memory management systems that manage housekeeping information about the stored information. For example, a memory management system may keep track of information such as which object resides where and occupies how much space.

While static memory management information may be useful for certain purposes, it does not offer a useful depiction in terms of dynamic uses of the memory objects. Dynamic information about the use of memory objects includes, for example, who is using what object at what time and who is sharing what data with whom. Making such information readily accessible may help many applications to solve problems in a more effective manner.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
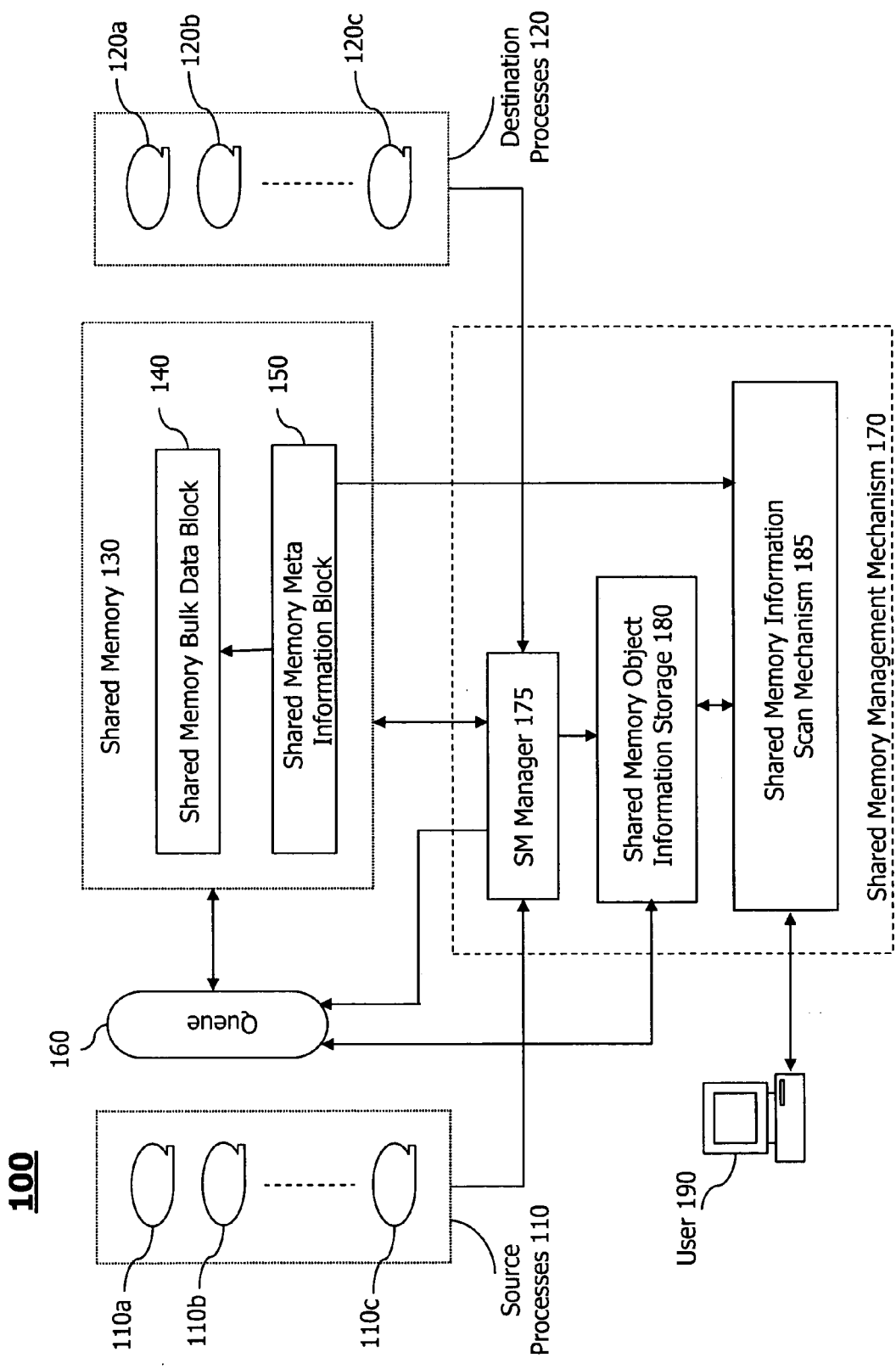
FIG. 1 depicts one exemplary embodiment of a framework that facilitates active tracking and retrieval of shared memory resource information.

FIG. 1 depicts a first exemplary embodiment of a framework 100 for facilitating active tracking and on-demand retrieval of shared memory resource information. Under framework 100, a plurality of source processes 110 (e.g., processes 100a, 110b, . . . , 110c) may share memory objects with a plurality of destination processes 120 (e.g., processes 120a, 120b, . . . , 120c) in a shared memory 130 via a shared memory management mechanism 170.

A source process (e.g., process 110a) may communicate with the shared memory management mechanism 170 to achieve various tasks. For example, the source process 110a may send a request to the shared memory management mechanism 170 to indicate that a particular memory object in the shared memory 130 is ready to be shared. On the other hand, a destination process (e.g., process 120a) may also communicate with the shared memory management mechanism 170 to accomplish different tasks. For example, the destination process 120b may send a request to the shared memory management mechanism 170 to obtain a memory object that has been indicated as shared.

Each process illustrated in FIG. 1 may be a generic process, which may represent a particular process, a specific task, or a thread within a process. That is, a process described in FIG. 1 is any unit of operational process that is capable of interacting with the shared memory management mechanism 170 to perform certain functionality related to the shared memory 130.

In addition to facilitating memory sharing between source processes 110 and the destination processes 120, the shared memory management mechanism 170 also actively keeps track of relevant information associated with memory objects and facilitates retrieval of such information based on a request from a user 190. For instance, the user 190 may request information associated with all the memory objects shared between a particular source process (e.g., process 110b) and a particular destination process (e.g., process 120c). Based on a request, the shared memory management mechanism 170 collects the requested information and sends such information to the user 190.

The shared memory 130 may comprise a shared memory bulk data block 140 and a shared memory meta information block 150. The shared memory bulk data block 140 stores shared memory objects in the form, for example, of user bulk data. It may be realized in a type of memory that is appropriate for high-speed sequential data transfer. The shared memory meta information block 150 corresponds to a memory area where meta information with respect to the memory bulk data (stored in the shared memory bulk data block 140) resides. The meta information may be used to control the access to the memory bulk data in the shared memory bulk data block 140. For that reason, the shared memory meta information block 150 may be realized using a type of memory that is suitable for rapid random access with low latency.

To control the access to the shared memory bulk data, each shared memory object in the shared memory bulk data block 140 may have a corresponding control object in the shared memory meta information block 150. The control object may be used to facilitate the access of the underlying shared memory object.

Memory objects in the shared memory 130 may be shared among different processes. Information related to memory object sharing is tracked and recorded in the framework 100. Both object sharing and information recording may be achieved through the shared memory management mechanism 170, comprising a share memory (SM) manager 175, a shared memory object information storage 180, and a shared memory information scan mechanism 185. The SM manager 175 interacts with processes to facilitate the need of object management and sharing. Object management may include object creation, updating, or destruction. For example, a source process (e.g., process 110a) may request the SM manager 175 to create a new object of certain type. It may also request the SM manager 175 to invoke the queue mechanism 160 to achieve memory object sharing. The latter may manage a queue object (not shown) designed to record sharing information. Upon invocation, the queue mechanism 160 transfers, based on the request of the source process 110a, the ownership of the shared object from the source process 110a to its associated queue.

When a destination process (e.g., 120a) is ready to share the object, it sends a request to the SM manager 175 with a handle of the object. The SM manager 175 invokes the queue mechanism 160 with the handle. To allow the destination process 120a to have access to the shared object, the queue mechanism 160 transfers, based on the request of the destination process 120a, the ownership of the shared object from the queue to the destination process 120a.

The queue mechanism 160 keeps track of the information related to changes of ownership of shared memory objects and records such information in the shared memory object information storage 180. The shared memory object information may describe various aspects of shared memory objects. For example, it may specify the type, the size, or current owner of an underlying shared object.

Information stored in the shared memory object information storage 180 may be accessed, upon a request from the user 190, by the shared memory information scan mechanism 185. When a user request is received, the shared memory information scan mechanism 185 may retrieve the requested information from both the shared memory object information storage 180 and the shared memory meta information block 150. Relevant information scanned from the shared memory meta information block 150 may also be subsequently recorded in the shared memory object information storage 180 for future use.

Besides sharing memory objects, processes may also perform other tasks. For example, a process may request the SM manager 175 to create a new instance of a particular type of object. In this case, the SM manager 175 facilitates both the creation of the new instance of object and recording the information associated with the new instance of object in the shared memory object information storage 180. For example, for each new instance of an object created, the SM manager 175 may generate an object handle for the new instance and stores the handle information, together with other information about the object, in the shared memory object information storage 180.

Figure 3:
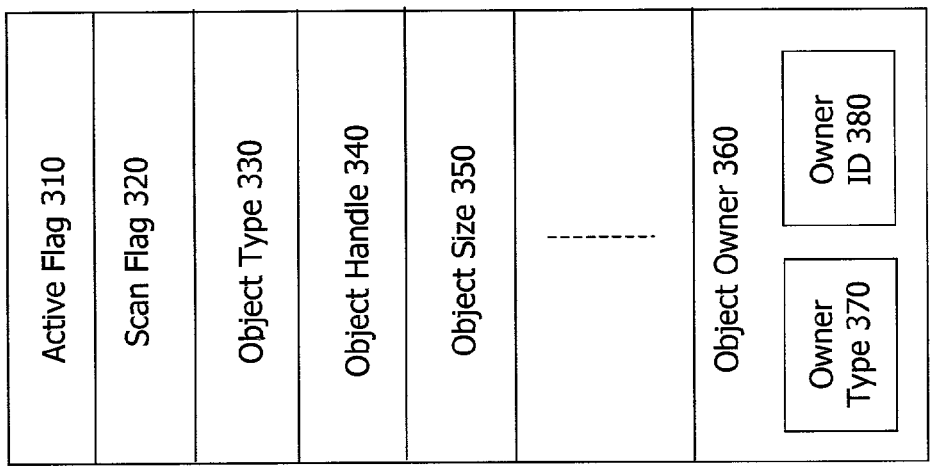
FIG. 3 illustrates an exemplary construct of shared memory resource information associated with a shared memory object.

FIG. 3 illustrates an exemplary construct 300 of shared memory object information associated with a shared memory object. Shared memory object information may include, but not limited to, an active flag 310, a scan flag 320, an object type 330, an object handle 340, an object size 350, and a description of the owner 360 of the underlying object. The active flag 310 may indicate whether the underlying object is currently active. The scan flag 320 may indicate whether the scanning of the shared memory object information on the underlying object is permissible. The object handle 340 may correspond to an identification with which a process may access the object. The object owner 360 may be further divided into an owner type 370 and an owner ID 380, where the former identifies the type of the owner and the latter provides the ID of the owner. For example, a queue may own a shared memory object (e.g., during transition). In this case, owner type corresponds to a queue type. A shared memory object may also be owned by a process. In this case, owner type is a process. For example, a source process may own a shared memory object prior to passing the ownership to the queue. A destination process may subsequently own the shared memory object after the ownership is transferred from the queue to itself.

The attributes object type 330 and object size 350 in the exemplary construct 300 describe properties of the underlying shared object itself. An object type can be one of a plurality types of possible objects and may be associated with different sizes.

Figure 4:
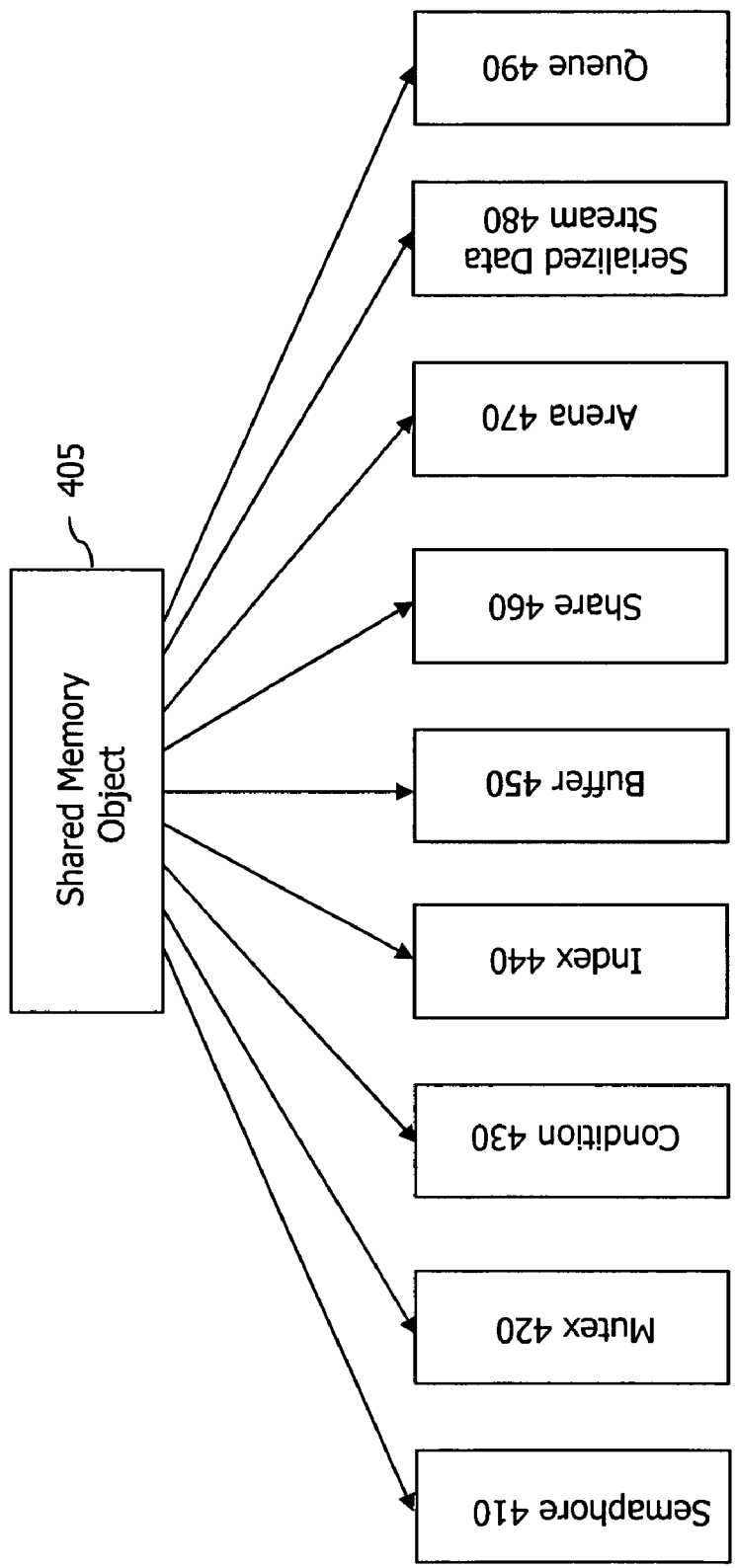
FIG. 4 describes exemplary types of shared memory objects.

FIG. 4 describes exemplary types of shared memory objects. A shared memory object 405 may be of a type including, but not limited to, a semaphore 410, a mutex 420, a condition 430, an index 440, a buffer 450, a share 460, an arena 470, a serialized data stream 480, and a queue 490.

Some of the illustrated object types may be associated with a primitive size. For example, a mutex object may have a fixed primitive size. Some other illustrated object types may have a composite size. For example, an arena object may correspond to an object that is a linked list of a basic share type of object with a variable length. In this case, the sizes of arena objects may differ from object to object. Attribute object size 350 refers to the overall size of an underlying object.

Figure 2:
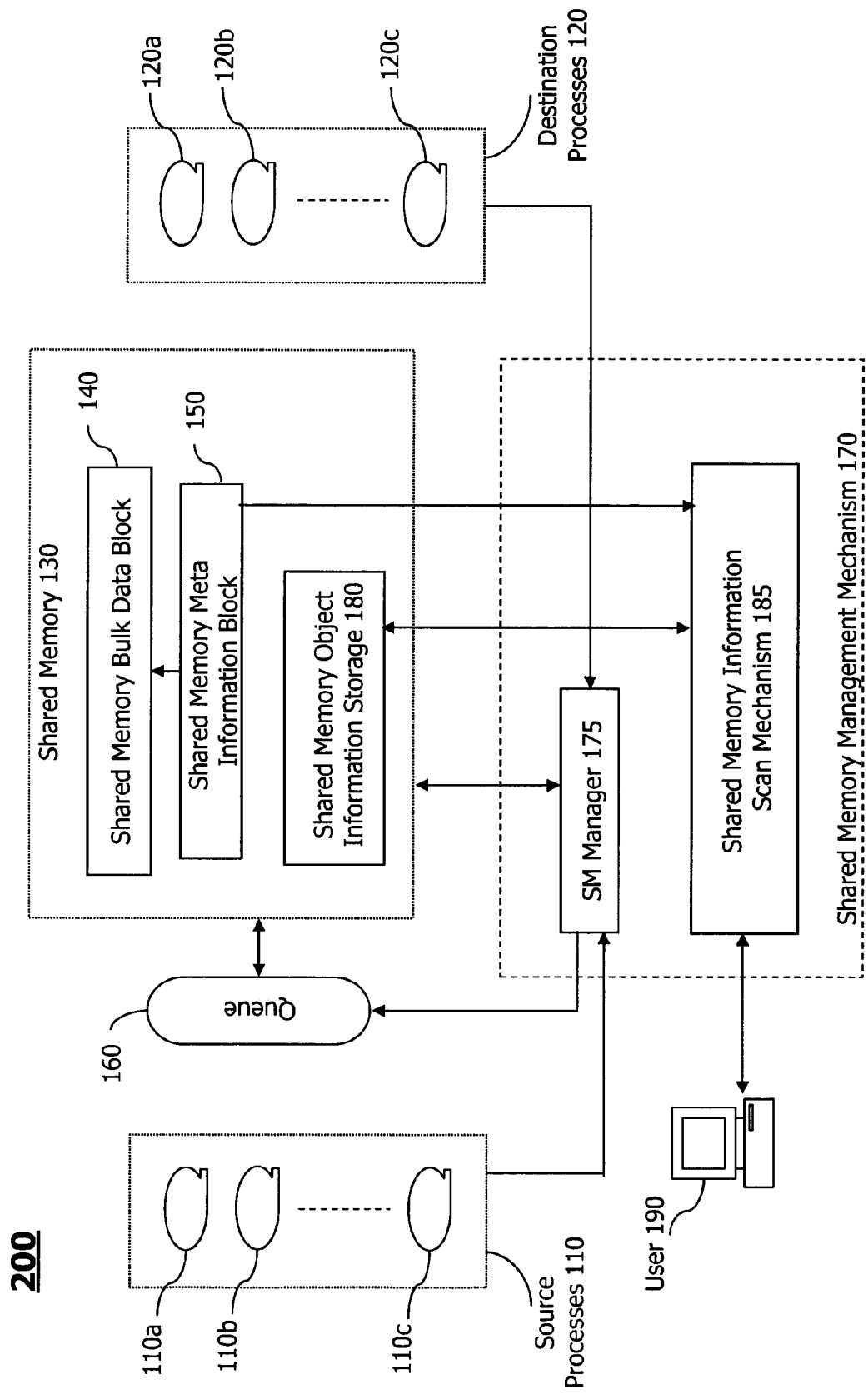
FIG. 2 depicts a different exemplary embodiment of a framework for active tracking and retrieval of shared memory resource information.

FIG. 2 depicts a different exemplary embodiment 200 of the mechanism of active tracking and retrieval of shared memory resource information, in accordance with the principles of the inventions. In this embodiment, the shared memory object information storage 180 is realized as part of the shared memory 130. Such an implementation may be motivated by speed requirement. If an application requires faster access to the shared memory object information, the shared memory object information storage 180 may be realized within the memory. It may also be implemented based on rapid random access. Alternatively, it may be implemented in bulk data memory with sequential data access. For applications that do not demand fast access of such information, the shared memory object information storage 180 may even be realized using file systems. For example, if the shared memory object information is used for debugging purposes where access speed is not crucial, the shared memory object information storage 180 may be implemented as a file system. Which specific embodiment to be used may depend on an application's needs.

Figure 5:
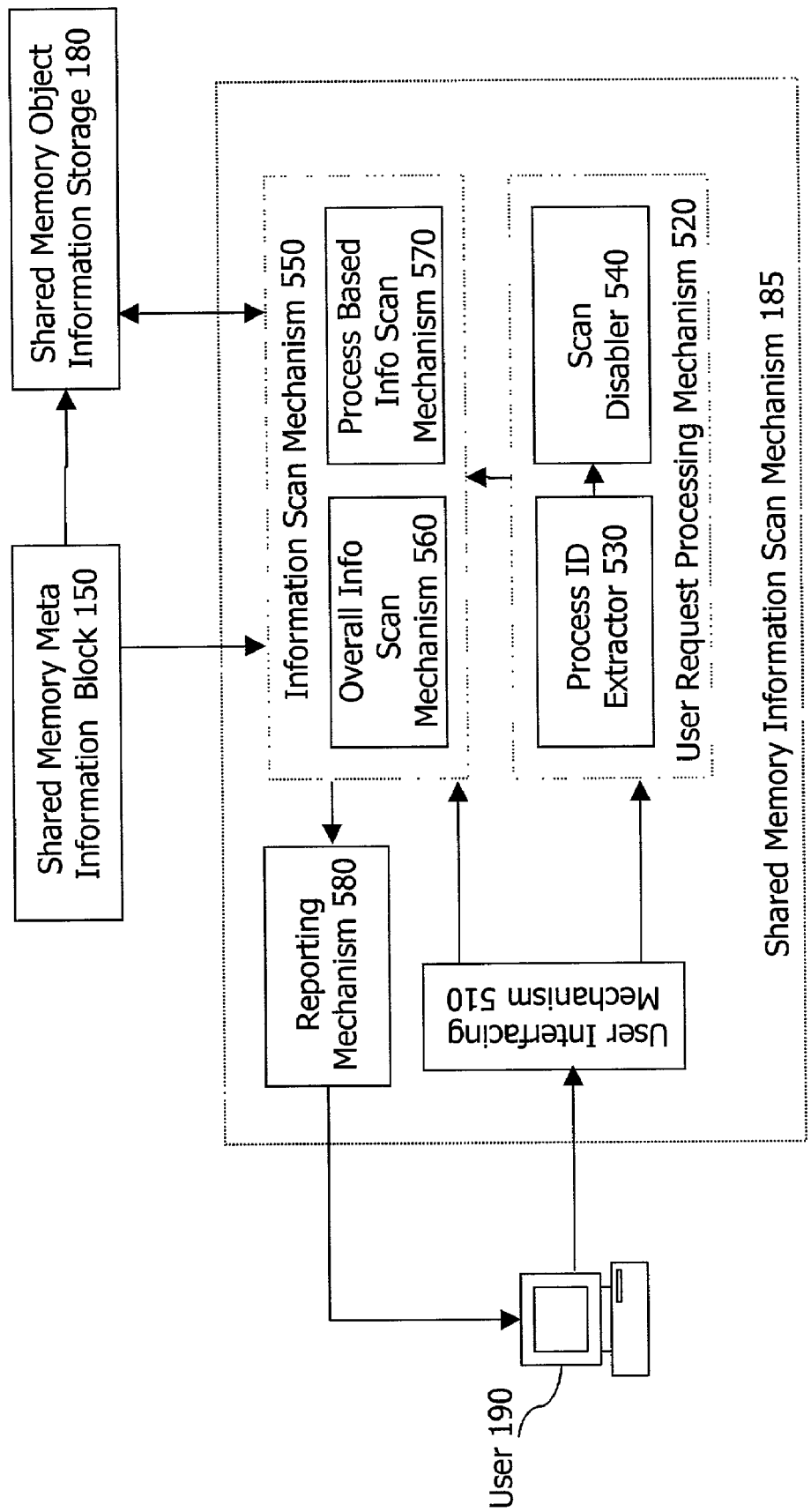
FIG. 5 depicts the internal structure of a shared memory information scan mechanism.

FIG. 5 depicts the internal structure of the shared memory information scan mechanism 185. The shared memory information scan mechanism 185 comprises a user interfacing mechanism 510, a user request processing mechanism 520, an information scan mechanism 550, and a reporting mechanism 580. The user interfacing mechanism 510 provides an interface to interact with the user 190. Such an interface may be realized as application programming interface (API) or it may be realized in other forms such as a graphical user interface (GUI) or a web-based interface.

The user request processing mechanism 520 is responsible for processing a request forwarded, via the user interfacing mechanism 510, from the user 190. It determines the nature of the request and may extract information contained in the request that is necessary to perform requested tasks. For example, the user 190 may request to scan shared memory object information associated with only some of the processes. In this case, together with the request, the user 190 may send a list of process IDs to define the scope of the scan. Such process IDs are extracted by the user request processing mechanism 520 prior to performing the requested scan with respect to shared memory object information associated with the underlying processes. In certain situations, the user 190 may also request to block the scan of shared memory object information related to some processes. This may be achieve either prior to a scanning request or with a scanning request. The user request processing mechanism 520 may analyze a request and determine the nature of as well as the parameters associated with the request.

The user request processing mechanism 520 may include, but not limited to, a process ID extractor 530 and a scan disabler 540. The former extracts, from a user request, process IDs. The latter sets scan flags of shared objects to disable the scan of the information associated with the underlying objects. The scan disabler 540 may identify such objects according to a list of process IDs extracted (by the process ID extractor 530) from a request.

Extracted process IDs may be used, while scanning shared memory object information, to identify information that is either relevant or not relevant. For example, a list of processes may be provided to define the scope of requested shared memory object information. In this case, only the information associated with shared objects that belong to at least one of the given list of processes is to be retrieved. Alternatively, extracted process IDs may also be used to exclude the information associated with shared objects owned by the given list of processes. In this case, only the information associated with shared objects that do not belong to any of the processes in the given list is to be retrieved.

The information scan mechanism 550 performs a scan task according to what is requested by the user 190. For example, the user 190 may request to scan shared memory object information across all the shared objects. It may also request to scan shared memory object information related to only some processes. In this case, a list of such processes may be provided and theirs IDs may be used during scan. To facilitate different tasks, the information scan mechanism 550 includes an overall information scan mechanism 560, that scans shared memory object information across all active objects, and a process based information scan mechanism 570, that scans information associated only to those shared objects owned by a given list of processes.

The information scan mechanism 550 may retrieve requested information from different sources. It may scan information stored in the shared memory object information storage 180. It may also, when necessary, scan information stored in the shared memory meta information block 150. Once it retrieves information from the shared memory meta information block 150, it may store such information in the shared memory object information storage 180 for future use.

The information scan mechanism 550 is capable of scanning shared memory information associated with both basic and composite object types. For example, a primitive, such as a semaphore object, may have a fixed size. In this case, the size of a particular instance of a semaphore object may be identical to the size of the object type. This may not true, however, when an object is composed of a set of primitive objects. For example, a serialized data stream object may consist of a collection of objects of arena type. In addition, object size may change over time. For instance, when a serialized data stream object runs out of space, it may automatically invoke a function associated with the arena object type to append another primitive object of share type to it. The scanned shared memory object information reflects the dynamic information associated with the underlying shared objects.

The reporting mechanism 580 reports scanned the information according to a user request. Such reported information is eventually sent to the user 190. The reporting mechanism 580 is capable of reporting shared memory information associated with both basic and composite object types.

Figure 6:
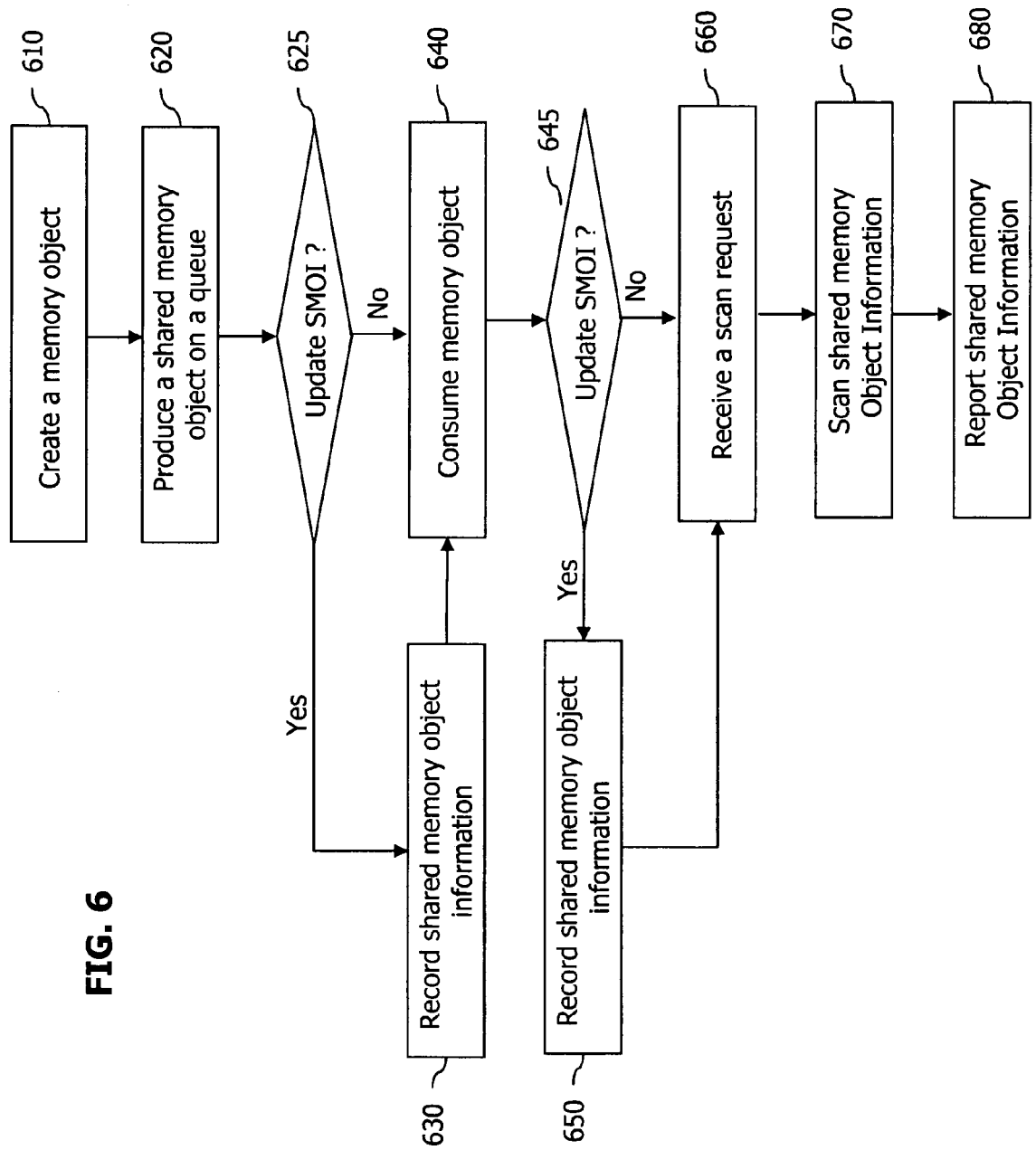
FIG. 6 is a flowchart of an exemplary process, in which shared memory object information is actively tracked and retrieved upon request.

FIG. 6 is a flowchart of an exemplary process, in which shared memory object information is actively tracked and can be retrieved upon request, according to embodiments of the inventions. To share a memory object, it is created first at 610. When a source process that creates and owns the object is ready to transfer the ownership, it produces, at 620, a reference to the shared memory object onto the queue. This may be achieved by invoking the shared memory management mechanism 170, which subsequently invokes the queue mechanism 160 to transfer the ownership of the shared object from the source process to the queue. If the shared memory object information needs to be updated, determined at 625, the queue mechanism 160 records, at 630, the information relevant to the transfer of ownership in the shared memory object information storage 180.

When a destination process is ready to consume the shared object, it sends a request to the shared memory management mechanism 170 which subsequently invokes the queue mechanism 160 to transfer the ownership from the queue to the destination process. The shared object, now owned by the destination process, is consumed at 640. When the shared memory object information needs to be updated with the information regarding this new ownership transfer, determined at 645, the queue mechanism 160 records, at 650, the information related to the transfer of ownership from the queue to the destination process.

The operations at 610 to 650 maybe performed independently and asynchronously. That is, the order depicted in FIG. 6 in which the operations are performed is merely for illustration purposes and it does not necessarily constrain the sequence of the operations in real systems. For example, a process may request to create a memory object while other processes are producing or consuming different shared memory object. In addition, source processes producing shared memory objects may do so independent of the intended destination processes, in so far as that the shared objects are produced prior to their consumption by the destination processes.

Independent of the operations involving shared memory object production and consumption, the framework 100 also operates to facilitate requests from users (e.g., the user 190) to access information related to shared memory object production and consumption. When the shared memory information scan mechanism 185 receives a request, at 660, from the user 190, it scans, at 670, the requested shared memory object information. Such scanned information is then reported, at 680, to the user 190.

Figure 7:
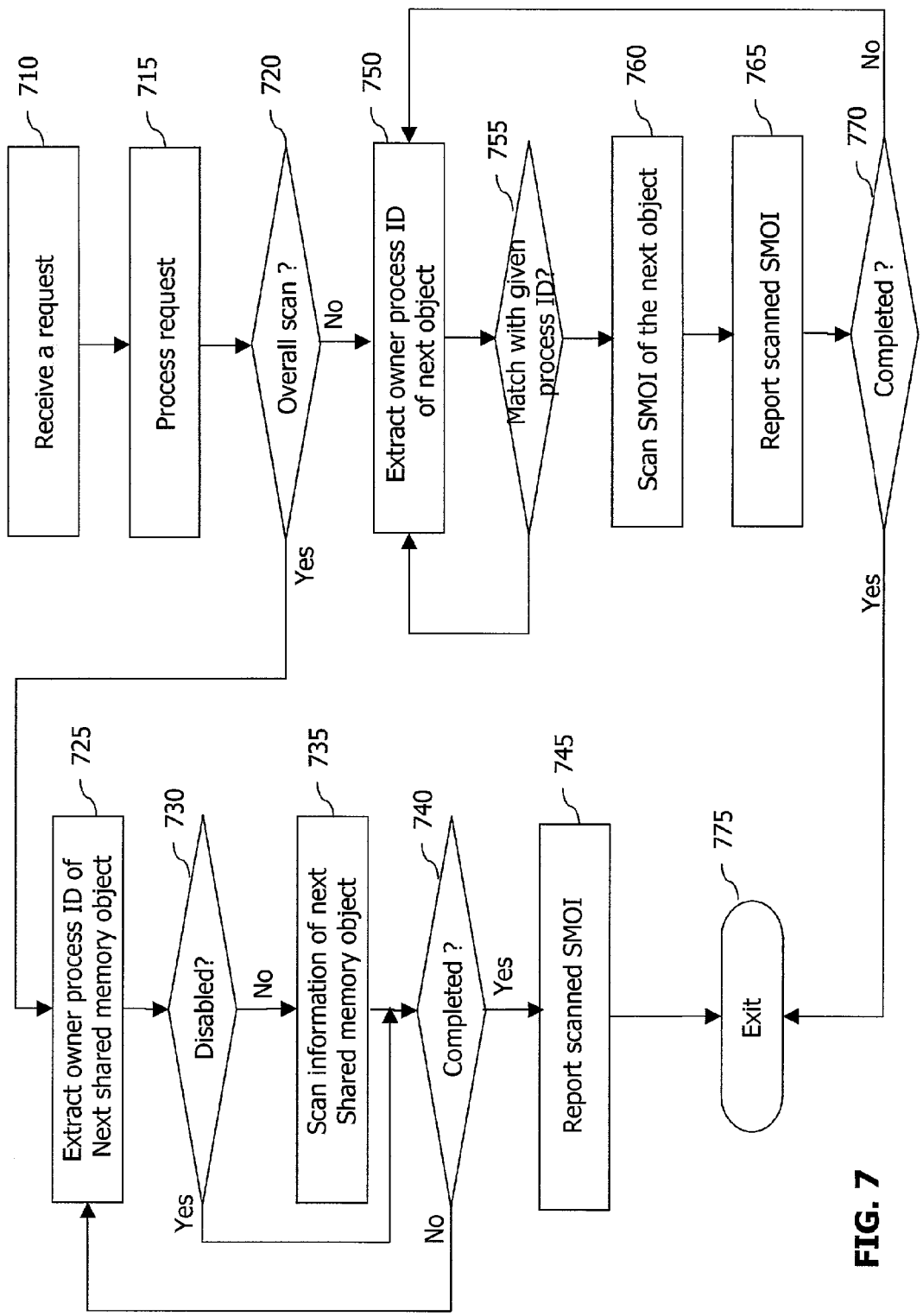
FIG. 7 is a flowchart of an exemplary process, in which a shared memory information scan mechanism, upon receiving a request, scans and retrieves shared memory resource information.

FIG. 7 is a flowchart of an exemplary process, in which the shared memory information scan mechanism 185, upon receiving a request, scans and retrieves requested shared memory resource information. A request is first received at 710. The request is processed at 715. The nature of the request is determined, at 720, to see whether the requested scan is an overall scan or a process based scan. If an overall scan is requested, the overall information scan mechanism 560 is invoked to scan every shared object provided that the scan flag is not set to forbid the scan. For each shared object, the owner process ID is first extracted, at 725, from the shared memory object information. If the owner process ID associated with the shared object is one of the process IDs provided to disable the scan, the scan for the shared memory object is not performed. This is determined at 730. If the scan of shared memory object is not disabled, the overall information scan mechanism 560 scans, at 735, the information associated with the shared memory object. This scan process continues until, determined at 740, all the shared memory objects have been processed. At the end of scanning the overall shared memory object information, such information is reported at 745 and the process exists at 775.

If a process based scan is requested, the process based information scan mechanism 570 is invoked to scan the share memory object information associated with each shared object that belongs to at least one explicitly described processes. This may be accomplished in different ways. In one embodiment (illustrated in FIG. 7), the process based information scan mechanism 570 may simply enumerate all shared memory objects and scan the information if the owner process ID of the scanned object matches with one of the given process IDs. This implementation may be adequate when run time scan speed is not essential in an application. A different embodiment (not shown) may be realized based on indices to shared memory objects established based on their owner process IDs. In this case, the shared memory object information storage 180 may need to be properly indexed based on the owner information of each shared memory object. This embodiment may be employed to improve run time scan speed.

In FIG. 7, the first mentioned embodiment for process based information scan is described. For each shared object, the owner process ID is first extracted, at 750, from the shared memory object information. If the owner process ID associated with the scanned shared object does not match with any of the process IDs provided in the request, the scanning and reporting is not performed. This is determined at 755. If the owner process ID is one of the provided process IDs, the process based information scan mechanism 570 scans, at 760, the information associated with the shared memory object. The scan information is then reported at 765. This scan process continues until, determined at 770, all the shared memory objects have been examined. Upon completion, the process exists at 775.

Figure 8:
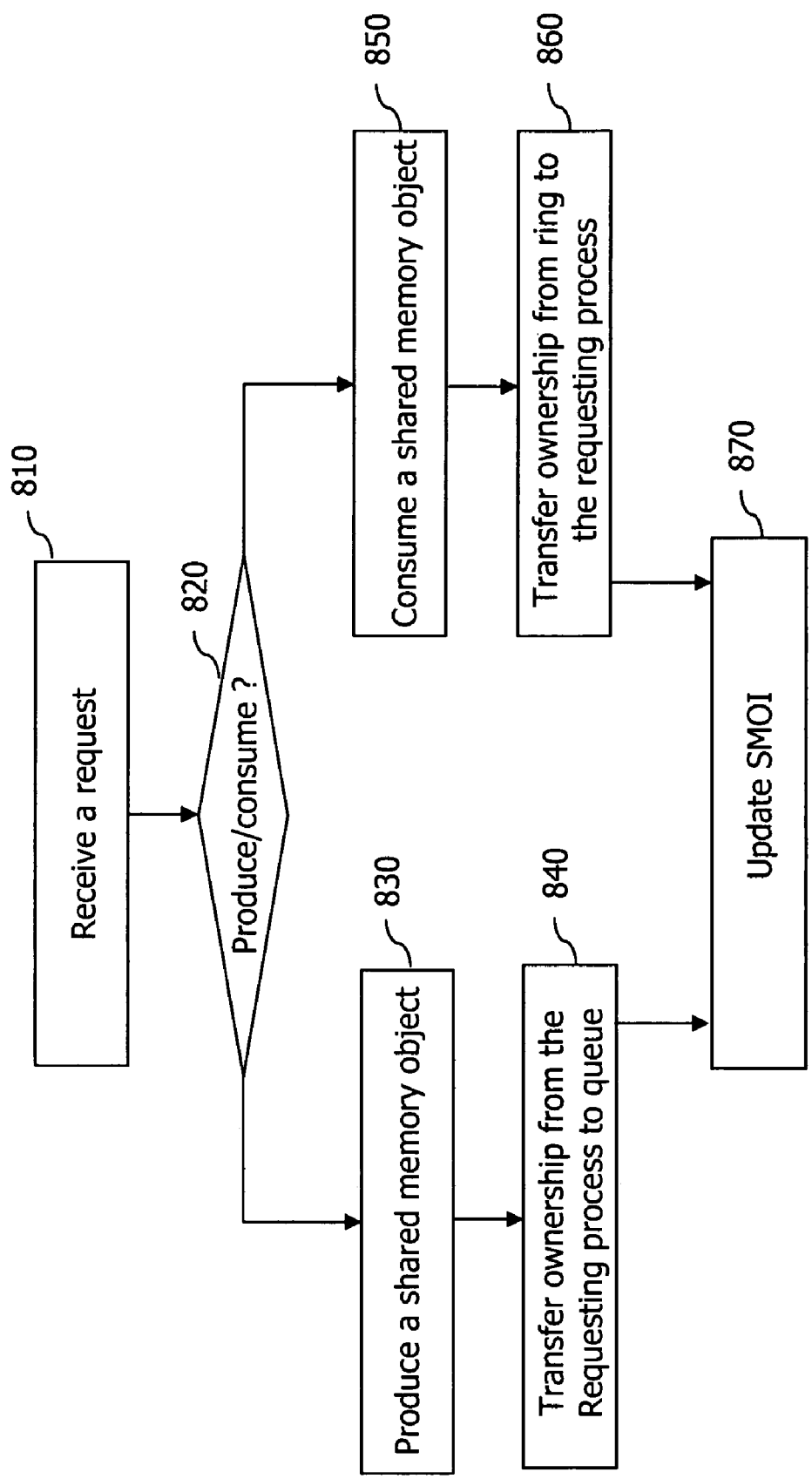
FIG. 8 is a flowchart of an exemplary process, in which a queue mechanism allows a source process and a destination process to share an memory object and keeps track of the information associated with ownership transfer.

FIG. 8 is a flowchart of an exemplary process, in which the queue mechanism 160 facilitates a source process to transfer ownership of a memory to a destination process and keeps track of the information associated with ownership transfer. A request is first received at 810. The nature of the request is determined at 820. If the request is from a source process to produce a reference of a shared memory object on the queue, the queue mechanism 160 produces, at 830, the reference of the shared object on the queue and then transfers, at 840, the ownership of the shared object from the source process to the queue. Information relevant to the transfer of ownership is then used to update, at 870, the shared memory object information.

If the request is from a destination process to consume the shared object, the queue mechanism permits the destination process to consume, at 850, the shared object and subsequently transfers, at 860, the ownership of the shared object from the queue to the destination process. Information relevant to the transfer of ownership is then used to update, at 870, the shared memory object information.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method, comprising:
    recording shared memory object information;
    scanning, upon a request, the shared memory object information; and
    reporting the shared memory object information,
    wherein the recording shared memory object information includes recording information related to at least two of:
        creating a shared memory object;
        producing a shared memory object wherein ownership of the shared memory object is transferred from a source process, producing the shared memory object, to a queue;

consuming a shared memory object wherein the ownership of the shared memory object is transferred from the queue to a destination process that consumes the shared memory object; and disabling a shared memory object.

2. The method according to claim 1, wherein the scanning includes:

determining a type of scan requested by the request;

performing, if the type of scan corresponds to an overall scan, a scan of the shared memory object information associated with all active shared memory objects; and performing, if the type of scan corresponds to a process based scan, the scan of the shared memory object information associated with the shared memory objects owned by at least one process.

3. A method for a shared memory information scan mechanism, comprising:

receiving a request for scanning shared memory object information;

scanning the shared memory object information according to the request by determining a type of scan requested by the request;

performing, if the type of scan corresponds to an overall scan, an overall scan of the shared memory object information associated with all active shared memory objects;

performing, if the type of scan corresponds to a process based scan, the process based scan of the shared memory object information associated with the shared memory objects owned by at least one process described in the request; and.

reporting the scanned shared memory object information.

4. The method according to claim 3, wherein performing the overall scan includes:

identifying each shared memory object;

determining whether the shared memory object is disabled for scan;

retrieving, if the scan for the shared memory object is not disabled, shared memory object information associated with the shared memory object.

5. The method according to claim 3, wherein performing the process based scan includes:

identifying the at least one process based on the request;

retrieving the shared memory object information of each and every shared memory object owned by the at least one process.

6. A method for a queue mechanism, comprising:

receiving a request from a process;

performing a produce operation if the request requests to produce a shared memory object on a queue, by producing a shared memory object on the queue; and updating shared memory object information to indicate that the ownership of the shared memory object is transferred from the process, that requests to produce the shared memory object, to the queue; and performing a consumer operation if the request requests to consume a shared memory object from the queue.

7. A method for a queue mechanism, comprising:

receiving a request from a process;

performing a produce operation if the request requests to produce a shared memory object on a queue; and performing a consume operation if the request requests to consume a shared memory object from the queue by consuming a shared memory object that has been previously produced on the queue; and updating shared memory object information to indicate that the ownership of the shared memory object is transferred from the queue to the process that requests to consume the shared memory object.

8. A system, comprising:

a shared memory for storing at least one shared memory object and information associated with the shared memory objects, the shared memory including a shared memory bulk data block for hosting the shared memory objects; and a shared memory meta information block for hosting the information associated with the shared memory objects;

a queue mechanism for managing a queue and for keeping track of memory object sharing information; and a shared memory management mechanism for managing accesses to the shared memory objects and associated shared memory object information.

9. The system according to claim 8, wherein the shared memory management mechanism comprises:

a shared memory manager for managing accesses to the shared memory objects; and a shared memory information scan mechanism for managing the access to information associated with the shared memory objects.

10. The system according to claim 9, wherein the shared memory information scan mechanism comprises:

a user request processing mechanism for processing a request;

an information scan mechanism for scanning the shared memory object information based on the request; and a reporting mechanism for reporting the shared memory object information.

11. The system according to claim 10, further comprising a shared memory object information storage residing in at least one of:

the shared memory; or the shared memory management mechanism.

12. A shared memory information scan mechanism, comprising:

a user request processing mechanism for processing a request, the user request processing mechanism including a process identification extractor for extracting a process identification from the request; and a scan disabler for disabling the scan of shared memory object information associated with a shared memory object according to the request;

an information scan mechanism for scanning shared memory object information associated with shared memory objects of at least one process based on the request; and a reporting mechanism for reporting the scanned shared memory object information.

13. The system according to claim 12, wherein the information scan mechanism includes:

an overall information scan mechanism for performing an overall scan of shared memory object information across all shared memory objects; and a process based information scan mechanism for performing a process based scan of shared memory object information of shared memory objects belonging to the at least one process.

14. A computer-readable medium encoded with data, the data, when accessed, causing a computer to:

record shared memory object information including record information related to at least two of:

creating a shared memory object;
producing a shared memory object wherein ownership of the shared memory object is transferred from a source process, producing the shared memory object, to a queue;
consuming a shared memory object wherein the ownership of the shared memory object is transferred from the queue to a destination process that consumes the shared memory object; and
disabling a shared memory object;
scan, upon a request, shared memory object information; and
report the shared memory object information.

15. The computer-readable medium according to claim 14, wherein the scan of the shared memory object information includes:
determining a type of scan requested by the request;
performing, if the type of scan corresponds to an overall scan, a scan of the information associated with all active shared memory objects; and
performing, if the type of scan corresponds to a process based scan, the scan of the information associated with the shared memory objects owned by at least one process.

16. A computer-readable medium encoded with data for a shared memory information scan mechanism, the data, when accessed, causing a computer to:
receive a request for scanning shared memory object information;
scan the shared memory object information according to the request by
determining a type of scan requested by the request;
performing, if the type of scan corresponds to an overall scan, an overall scan of the shared memory object information associated with all active shared memory objects; and
performing, if the type of scan corresponds to a processed based scan, a process based scan of the shared memory object information associated with the shared memory objects owned by at least one
processes described in the request; and
report the scanned shared memory object information.

17. The computer-readable medium according to claim 16, wherein performing the overall scan includes:
identifying each shared memory object;
determining whether the shared memory object is disabled for scan;
retrieving, if the scan for the shared memory object is not disabled, shared memory object information associated with the shared memory object.

18. The computer-readable medium according to claim 16, wherein performing the process based scan includes:
identifying the at least one process based on the request; and
retrieving shared memory object information of each and every shared memory object owned by the at least one process.

19. A computer-readable medium encoded with data for a queue mechanism, the data, when accessed, causing a computer to:
receive a request from a process;
perform a produce operation if the request requests to produce a shared memory object on a queue by
producing a shared memory object on the queue; and
updating shared memory object information to indicate that the ownership of the shared memory object is transferred from the process, that requests to produce the shared memory object, to the queue; and
perform a consumer operation if the request requests to consume a shared memory object from the queue.

20. A computer-readable medium encoded with data for a queue mechanism, the data, when accessed, causing a computer to:
receive a request from a process;
perform a produce operation if the request requests to produce a shared memory object on a queue; and
perform a consume operation if the request requests to consume a shared memory object from the queue by
consuming a shared memory object that has been previously produced on the queue; and
updating shared memory object information to indicate that the ownership of the shared memory object is transferred from the queue to the process that requests to consume the shared memory object.

* * * * *